United States Patent [19]

Kondo

[11] Patent Number: 5,189,732
[45] Date of Patent: Feb. 23, 1993

[54] TOUCH PANEL INPUT APPARATUS

[75] Inventor: Hirotaka Kondo, Owariasahi, Japan

[73] Assignee: Hitachi, Ltd., Tokyo, Japan

[21] Appl. No.: 679,132

[22] Filed: Mar. 28, 1991

Related U.S. Application Data

[63] Continuation of Ser. No. 269,304, Nov. 10, 1988, abandoned.

[30] Foreign Application Priority Data

Nov. 18, 1987 [JP] Japan .................. 62-289306

[51] Int. Cl.⁵ .................................. G06F 15/606
[52] U.S. Cl. .................... 395/155; 340/706; 178/18
[58] Field of Search ............ 364/518, 521; 178/18; 340/706, 747, 712, 721, 703; 395/155

[56] References Cited

U.S. PATENT DOCUMENTS

| | | | |
|---|---|---|---|
| 4,616,217 | 10/1986 | Nesbitt et al. | 340/747 |
| 4,672,683 | 6/1987 | Matsueda | 382/57 |
| 4,698,625 | 10/1987 | McCaskill et al. | 340/709 |
| 4,821,029 | 4/1989 | Logan et al. | 340/712 |

FOREIGN PATENT DOCUMENTS 60-124724  7/1985  Japan .
60-201426  10/1985  Japan .
61-82223  4/1986  Japan .

*Primary Examiner*—Gary V. Harkcom
*Assistant Examiner*—Phu K. Nguyen
*Attorney, Agent, or Firm*—Fay, Sharpe, Beall, Fagan, Minnich & McKee

[57] ABSTRACT

A touch panel input apparatus comprises a memory storing data for correcting a key position according to the distance between a touch panel and a cathode ray tube (CRT) display and also according to the surface shape of the display screen. In response to the application of a touch input, a key code corresponding to display information is read out from the memory to display an effective key input area. The key position correction data is determined depending on an enlarged effective range of the touch key input and also depending on the parallax of the user viewing the display screen.

16 Claims, 5 Drawing Sheets

| 51 | 52 | 54 |
|---|---|---|
| $x_1, y_1$ | $x_2, y_2$ | 1 |
| $x_3, y_1$ | $x_4, y_2$ | 2 |
| $x_1, y_3$ | $x_2, y_4$ | 4 |
| $x_3, y_3$ | $x_4, y_4$ | 5 |

TOUCH PANEL INPUT APPARATUS

This application is a continuation of application Ser. No. 269,304 filed Nov. 10, 1988 now abandoned.

BACKGROUND OF THE INVENTION

This invention relates to a touch panel input apparatus in which a display unit such as a CRT display or liquid crystal display is combined with a transparent touch panel superposed on the display screen of the display unit.

Such a touch panel display apparatus is known from the disclosure of, for example, JP-A-60-124724. In the prior art touch panel input apparatus, effective key-input ranges on the touch panel have been fixed for individual input keys. Therefore, individual patterns to be displayed on the display screen of the display unit to indicate the individual key input positions are required to be arranged and shaped to conform to the positions of the individual keys on the touch panel, respectively. Because of such a requirement, the prior art touch panel input apparatus has been disadvantageous in that the arrangement and shape of the patterns indicating the key input positions on the touch panel have been inevitably limited from the aspect of design.

SUMMARY OF THE INVENTION

It is an object of the present invention to provide a touch panel input apparatus in which the arrangement and shape of patterns displayed on a display screen of a display unit to indicate individual key input positions can be freely designed without any limitation.

Another object of the present invention is to provide a touch panel input apparatus whose performance and design value can be improved because of the capability of freely designing the arrangement and shape of the patterns displayed on the display unit to indicate the key input positions.

Still another object of the present invention is to provide a touch panel input apparatus in which effective key input ranges can be freely set so as to prevent application of an erroneous input due to parallax even when various modifications may be made in the arrangement and shape of the patterns displayed on the display unit to indicate the key input positions.

In the touch panel input apparatus of the present invention, position information determining an effective range of each of the key inputs to the touch panel and key output information to be generated when an associated key input is effective are stored in pairs in a memory unit together with corresponding pattern data stored for displaying patterns on the display unit to indicate a plurality of key input positions, so that, when a touch input is applied to the touch panel, the memory unit can be accessed to read out the corresponding key output information from the memory unit.

The key output information determining each of the effective key input ranges on the touch panel is stored in the memory unit together with each of the corresponding pattern data read out for displaying the individual patterns on the display unit to indicate the individual key input positions. Therefore, the effective key input ranges can be set to conform to the arrangement and shape of the patterns displayed on the display unit to indicate the key input positions.

DESCRIPTION OF THE PREFERRED EMBODIMENTS

Figure 1:
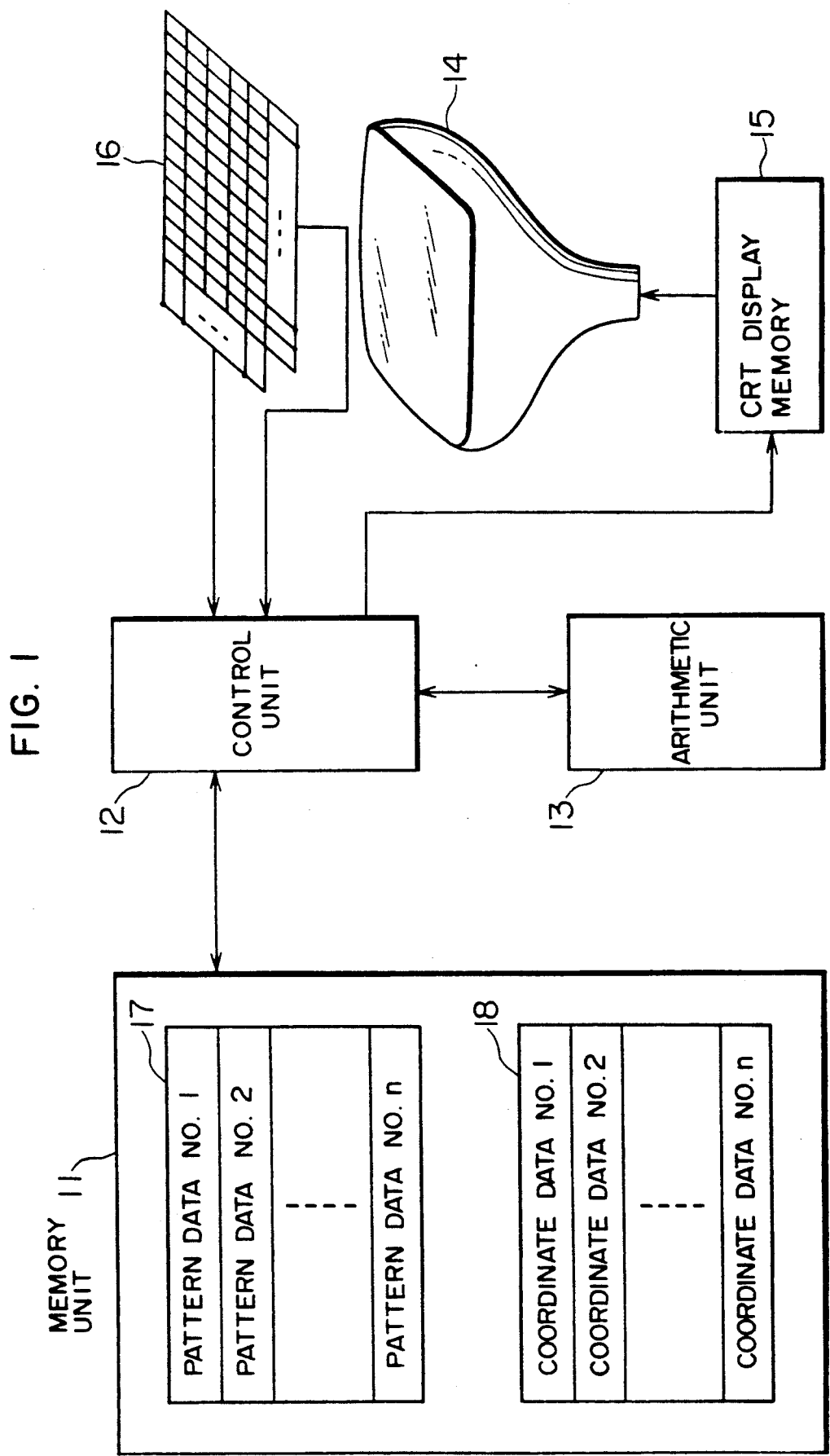
FIG. 1 is a block diagram showing the structure of an embodiment of the touch panel input apparatus of the present invention.

FIG. 1 is a block diagram showing the structure of a preferred embodiment of the touch panel input apparatus of the present invention.

Referring to FIG. 1, a memory unit 11 stores a group 17 of pattern data No. 1, No. 2, ---, No. n and a group 18 of coordinate data No. 1, No. 2, ---, No. n. Each of the pattern data displays patterns indicating a group of key input positions. When the embodiment of the touch panel input apparatus of the present invention is applied to, for example, an automatic teller machine, the pattern data No. 1 displays a group of key areas indicating various transactions including cash payment, cash deposit and balance inquiry, while the pattern data No. 2 displays a group of key areas indicating numeric values 1, 2, ---, 0. Each of the pattern data may include a guide pattern for guiding manipulation by the user. Besides these pattern data No. 1, No. 2, ---, No. n for indicating such key input positions, the memory unit 11 may further store pattern data to be used for the purpose of user's manipulation guidance only, so that the desired pattern data can be read out when the manipulation guidance is required.

Figure 2:
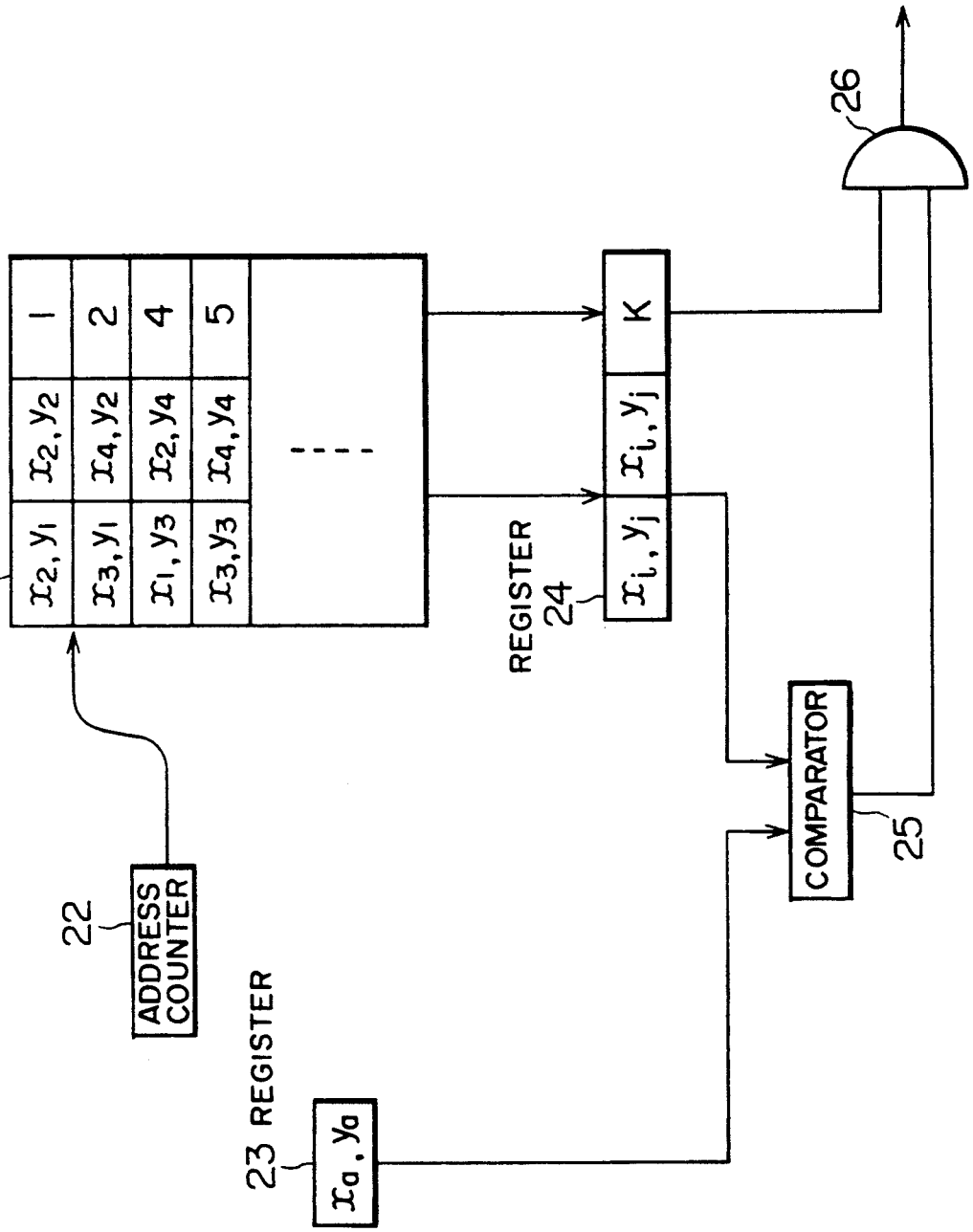
FIG. 2 shows the detailed structure of the arithmetic operation unit shown in FIG. 1.

The touch panel input apparatus further includes a control unit 12, an arithmetic processing unit 13, a color CRT display 14, a memory 15 for the CRT display 14, and a transparent touch panel 16 superposed on the display screen of the color CRT display 14. FIG. 2 shows in detail the structure of the arithmetic processing unit 13.

It is assumed herein that the pattern data No. 2 displays the numeric key area group, and this group is displayed on the color CRT display 14. The control unit 12 reads out the pattern data No. 2 from the memory unit 11 and writes the pattern data No. 2 in the CRT display memory 15 to display the pattern data No. 2 on the display screen of the color CRT display 14.

Figure 3:
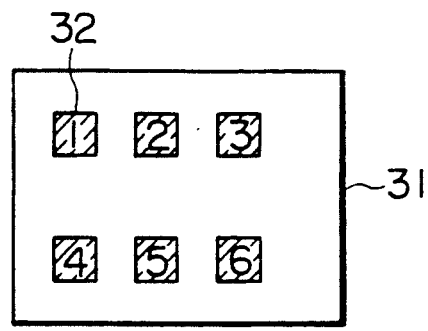
FIG. 3 shows an example of patterns displayed on the display screen of the CRT display shown in FIG. 1.
Figure 4:
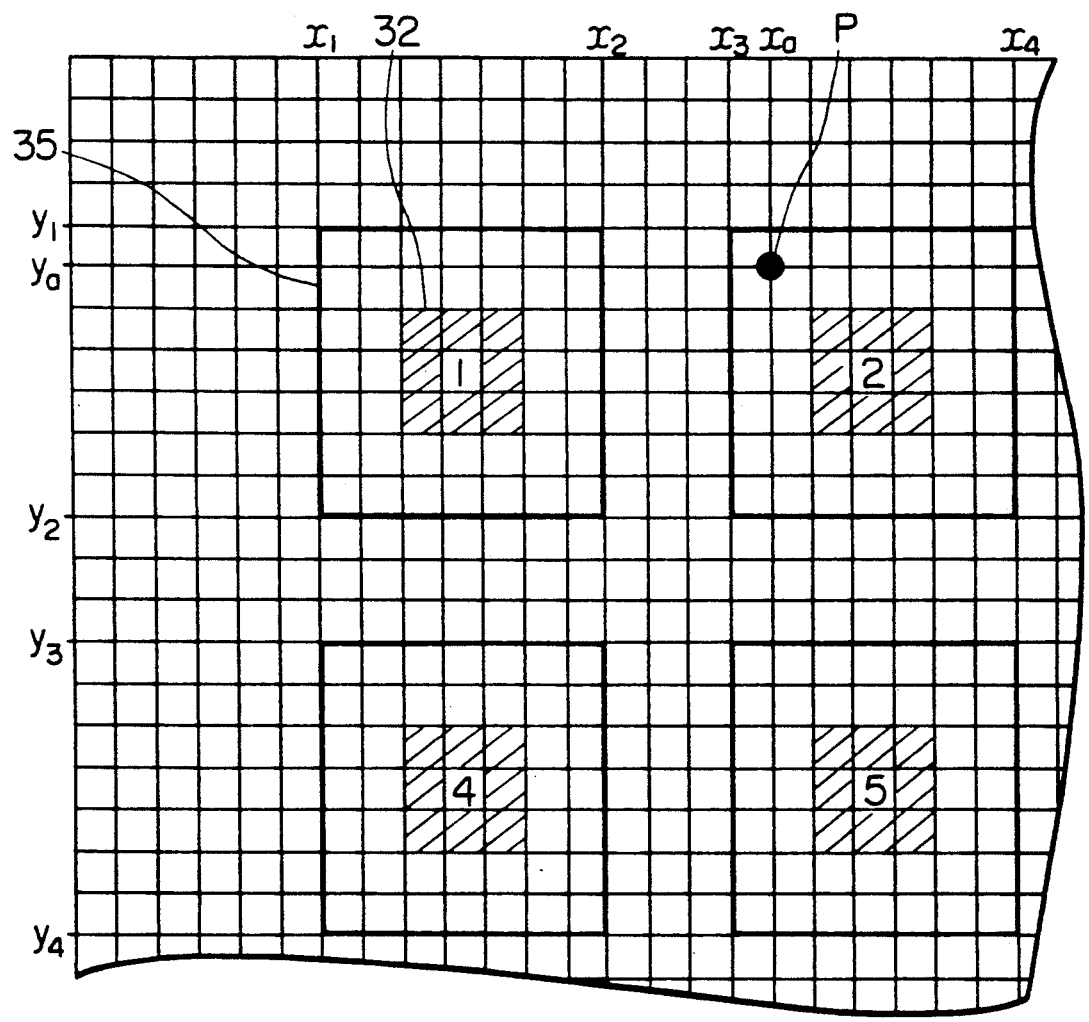
FIG. 4 is an enlarged view of part of FIG. 3.

FIG. 3 shows a portion 31 of the display screen of the color CRT display 14 on which a group of numeric key areas 32 is displayed. FIG. 4 is an enlarged view of part of FIG. 3 to show intersections of touch sensors formed in the touch panel 16. In FIGS. 3 and 4, the individual numeric key areas are shown by the hatchings.

Figures 5, 6A:
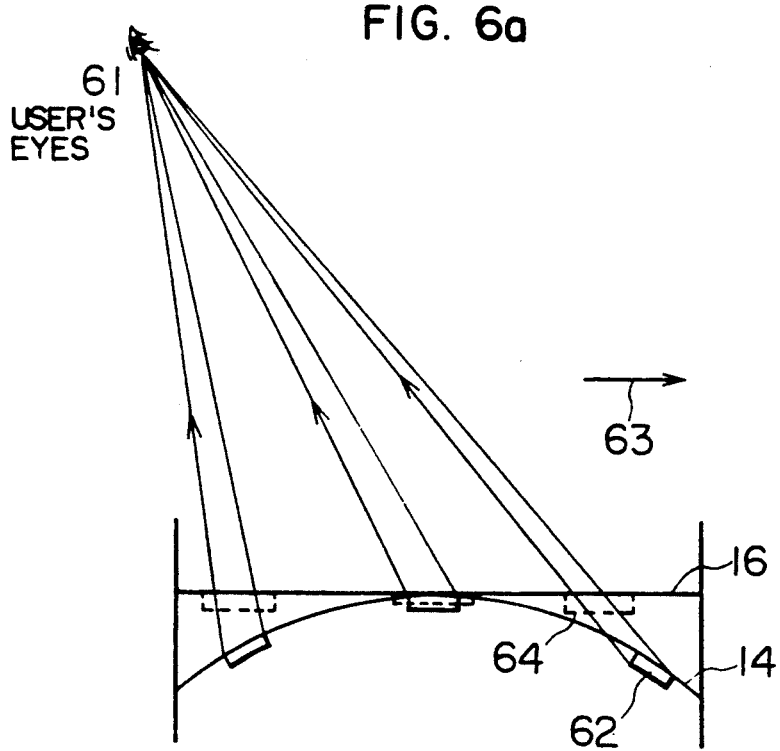
FIG. 5 shows details of the coordinate data shown in FIG. 2.
FIGS. 6a and 6b show part of another embodiment of the present invention.

As soon as the numeric key areas 32 are displayed on the color CRT display 14, the coordinate data No. 2 corresponding to the pattern data No. 2 is read out from the memory unit 11 to be supplied to the arithmetic processing unit 13. The detail of the coordinate data No. 2 is shown in FIG. 5. It will be seen in FIG. 5 that, for each of the numeric key areas 32 displayed on the color CRT display 14, two sets of x, y coordinates 51, 52 and a code 54 corresponding to the key number are stored in pair in the memory unit 11. For example, a square range surrounded by the combination of the coordinates ($x_1$, $y_1$), ($x_2$, $y_2$) and the coordinates ($x_1$, $y_2$), ($x_2$, $y_1$) determined by the coordinates ($x_1$, $y_1$), ($x_2$, $y_2$) define the effective range or area of the key No. "1" on the touch panel 16. The same applies to the effective ranges of the keys No. "2", No. "4" and No. "5".

In FIG. 4, such effective ranges 35 of touch inputs corresponding to the individual numeric key areas 32 are shown by the thick solid lines. It will be seen from FIG. 4 that the effective range 35 of the touch input corresponding to each of the key areas 32 is set to be wider in all directions than the corresponding numeric key area 32 displayed on the color CRT display 14.

The coordinate data No. 2 read out from the memory unit 11 and supplied to the arithmetic processing unit 13 under control of the control unit 12 is stored in a coordinate data table 21 shown in FIG. 2, and a coordinate data table address counter 22 is initialized.

It is supposed now that a point P having a coordinate ($x_a$, $y_a$) on the touch panel 16 shown in FIG. 4 is depressed in the initialized state of the address counter 22. When the point P on the touch panel 16 is touched by, for example, the finger of the user, the control unit 12 detects the coordinate data ($x_a$, $y_a$) of the point P. The detected coordinate data ($x_a$, $y_a$) is transferred from the control unit 12 to the arithmetic processing unit 13. The transferred coordinate data ($x_a$, $y_a$) is set in a register 23 in the arithmetic processing unit 13.

The coordinate data corresponding to the count of the coordinate data table address counter 22 is then read out from the coordinate data table 21 and supplied to a register 24 under control of the control unit 12, and the coordinate data read out and registered in the register 24 is compared by a comparator 25 with the coordinate data ($x_a$, $y_a$) set in the register 23. Suppose now that the coordinate data read out from the coordinate data table 21 and registered in the register 24 represents coordinates ($x_i$, $y_i$) and ($x_j$, $y_j$). Then, the comparison by the comparator 25 is continued until the coordinate data satisfying the condition $x_i < x_a < x_j$ and $y_i < y_a < y_j$ is read out from the coordinate data table 21 and registered in the register 24. That is, the coordinate data table address counter 22 counts up, and the comparison by the comparator 25 continues until the coordinate data ($x_a$, $y_a$) satisfying the condition $x_i < x_a < x_j$ and $y_i < y_a < y_j$ is finally read out from the coordinate data table 21.

When the coordinate data ($x_a$, $y_a$) satisfies the condition $x_i < x_a < x_j$ and $y_i < y_a < y_j$, the comparator 25 applies its output signal to an AND gate 26, and the key code K corresponding to the key number of the coordinate data ($x_a$, $y_a$) registered in the register 24 at that time is supplied to the control unit 12 to inform that the key corresponding to the key code K is depressed. On the other hand, when the coordinate data ($x_a$, $y_a$) does not satisfy the above condition, the control unit 12 is informed of the fact that depression of the key having the coordinate data ($x_a$, $y_a$) is invalid.

In the above example, the point P having the coordinate ($x_a$, $y_a$) satisfies the condition $x_3 < x_a < x_4$ and $y_1 < u_a < y_2$, and the coordinate ($x_a$, $y_a$) lies within the effective range of key depression surrounded by the thick solid lines as shown in FIG. 4. Therefore, the key depression data of the key No. "2" is supplied from the arithmetic processing unit 13 to the control unit 12.

As a result, among the key areas shown by the hatchings in FIG. 4, the key area corresponding to the key No. "2" is identified, and the corresponding data stored in the CRT display memory 15 is displayed in a different color for a predetermined period of time to indicate that the key No. "2" is now depressed.

According to the embodiment of the touch panel input apparatus described above, the coordinate data determining the effective key input range on the touch panel 16 can be freely selected. Therefore, the present invention is advantageous in that the position and shape of patterns displayed on the color CRT display 14 to indicate key input positions can be freely designed.

Further, since the effective key input ranges on the touch panel 16 are selected to be as wide as possible, an adverse effect of, for example, parallax can be minimized even when a point displaced from the normal key area to be displayed on the color CRT display 14 may be touched by the user due to the parallax.

Figure 6B:
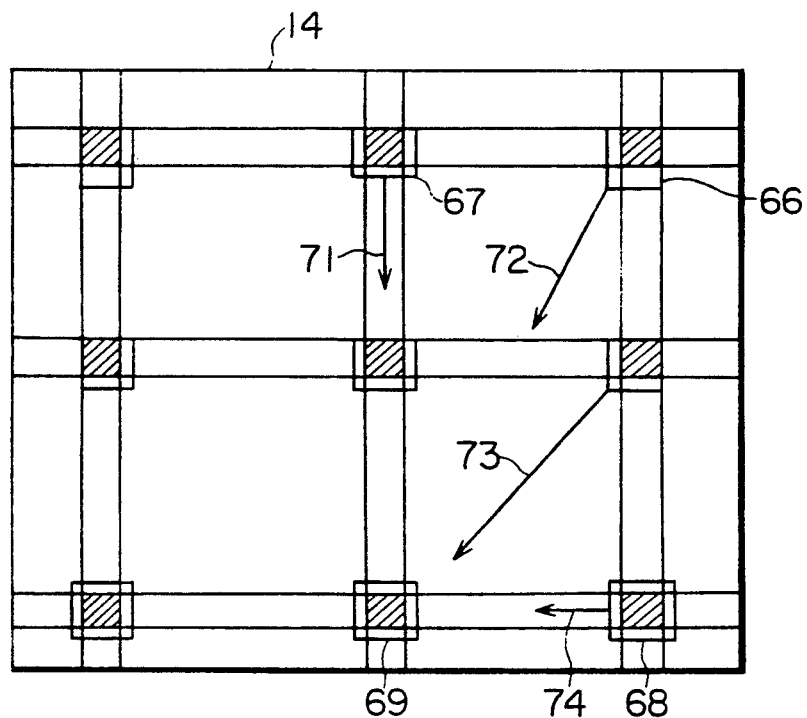

FIGS. 6a and 6b show part of another embodiment of the touch panel input apparatus according to the present invention. Referring to FIGS. 6a and 6b, a transparent touch panel 16 is integrally superposed on a curved display screen of a color CRT display 14 to constitute a display/input device disposed in a horizontal direction. In FIG. 6a, the upper surface of the touch panel 16 is displaced in a direction as shown by the arrow 63 relative to the fixation line of the eyes 61 of the user. A display key area 62 on the display screen of the color CRT display 14 is shifted in the direction of the arrow 63 from an input key area 64 on the touch panel 16 in the relation shown in FIG. 6a, and, when this input key area 64 is viewed from the eyes 61 of the user, the input key area 64 is virtually superposed on the display key area 62, so that the user can effectively touch the input key area 64 to exhibit the desired numeric display by the display key area 62. That is, the parallax relative to the curvature of the display screen of the color CRT display 14 is to be taken into consideration to store the two sets of x, y coordinates in the coordinate data table 21 shown in FIG. 2. Thus, the two sets of x, y coordinates stored in the coordinate data table 21 determine an effective key input range which is more or less shifted toward the center of the CRT display screen underlying the touch panel 16. As shown in FIG. 6b, an effective key input range 66 located adjacent to the right-hand upper corner of the CRT display screen is shifted and enlarged in a direction as shown by the arrow 72, while another effective key input range 67 is shifted and enlarged in a direction as shown by the arrow 71. Arrows 73 and 74 show further directions of shifting and enlarging for their corresponding effective key input areas. The amounts of shifting of the effective key input ranges 68 and 69 located beneath the effective key input ranges 66 and 67 in FIG. 6b are less than those of the effective key input ranges 66 and 67.

Figure 7:
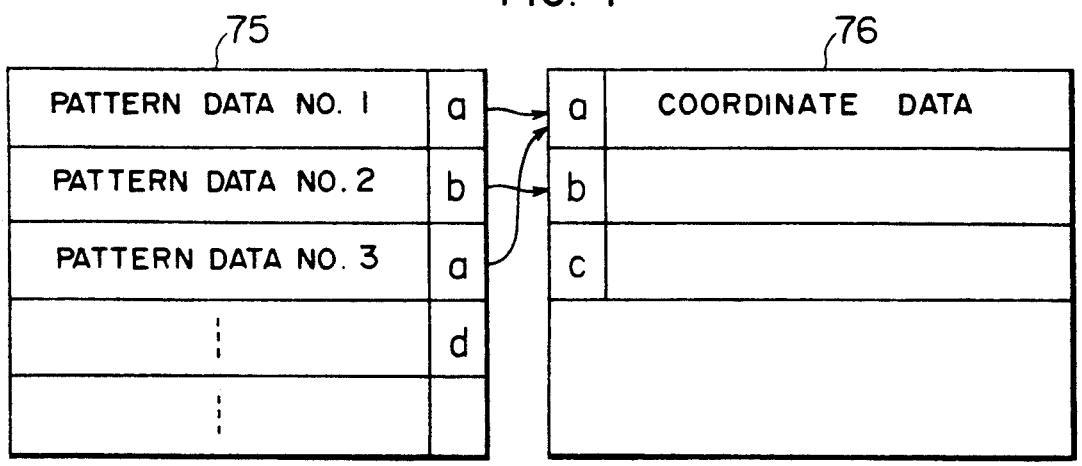
FIG. 7 shows part of still another embodiment of the present invention.

FIG. 7 shows part of still another embodiment of the present invention in which a pattern data region 75 and a coordinate data region 76 are arranged in series in the memory unit 11. Pattern data stored in the pattern data region 75 include coordinate data address information a, b, c, d, --- to indicate that one of the pattern data forms a pair with the corresponding one of the coordinate data. Therefore, the desired data pair (x, Y) can be immediately read out to be stored in the coordinate data table 21.

I claim:

1. A pointing input panel apparatus, comprising:

display means;

transparent panel means for receiving a pointing input superposed on a display screen of said display means;

pattern memory means storing a plurality of pattern data including data of display areas displayed on said display means indicating pointing input positions;

key position memory means storing a plurality of position information each defining one of a plurality of effective areas for accepting pointing inputs made in correspondence to each of said display areas;

said key position memory means further storing key code information read out in response to a pointing input to said panel means for identifying said effective areas; and said panel means being separated from said display screen such that an apparent alignment of said display areas and said effective areas changes when viewed from different positions thus causing parallax induced pointing input errors to occur for pointing inputs made about the periphery of said display areas; and each of said effective areas having a periphery with a portion thereof that extends in a direction outwardly with respect to a like portion of the periphery of a corresponding one of the display areas to form an overlap area for accepting said parallax induced pointing input errors wherein the extending direction and size of the overlap area for each of the effective areas change in accordance with a position of said corresponding display areas on said display screen.

2. A panel apparatus according to claim 1, wherein, when a pointing input is applied to one of said display areas positioned on an upper part of the display screen of said display means, the overlap area of one said effective area corresponding to said one display area is enlarged and shifted toward a center of said display screen.

3. A panel apparatus according to claim 1, wherein said pattern memory means includes a region storing address location information of said position information stored in said key position memory means.

4. A panel apparatus according to claim 1, further comprising a register connected to said panel to register the location of a pointing input, and comparator means connected to both of said key position memory means and said register to decide whether or not said location of the point input is included within one of said effective areas.

5. A panel apparatus according to claim 1, wherein said size of the overlapped areas for each of the effective areas decreases as the position of said display areas approaches a view point on said display screen that is in alignment with an operator of the apparatus.

6. A pointing input panel apparatus, comprising:
display means;

transparent panel means for receiving a pointing input superposed on a display screen of said display means;

pattern memory means storing a plurality of pattern data including data of display areas displayed on said display means indicating pointing input positions;

key position memory means storing a plurality of position information defining a plurality of effective areas for accepting pointing inputs made in correspondence to each of said display areas;

said key position memory means further storing key code information read out in response to a pointing input to said panel means for identifying said effective areas; and said panel means being separated from said display screen and said display areas being viewed from different viewing directions such that an apparent shifting in alignment of said effective areas with respect to said display areas occurs in variable amounts depending upon the different viewing directions, respectively, thus causing parallax induced pointing input errors to occur for pointing inputs made about the periphery of said display areas; and said effective areas being respectively shifted in different predetermined directions with respect to said display areas according to said amounts of the shifting for accepting said parallax induced pointing input errors.

7. A panel apparatus according to claim 6, wherein the amount of shifting of said effective areas for said display areas changes according to said relative orientations of said viewed position and said display areas such that said effective areas are respectively larger than said display areas according to said relative amounts of shifting.

8. A panel apparatus according to claim 7, wherein the amounts of shifting of said effective areas located on an upper part of said display screen is larger than those of said effective areas located on a lower part of said display screen.

9. A panel apparatus according to claim 6, wherein said effective areas are shifted toward a center one of said effective areas of said display screen.

10. A panel apparatus according to claim 9, wherein said center one is located below a center part of said display screen.

11. A panel apparatus according to claim 6, wherein said display screen is curved.

12. A panel apparatus according to claim 6, wherein said predetermined directions extend radially inwardly toward a center of said display screen.

13. A pointing input panel apparatus for an automatic teller machine, comprising:
display means disposed in a horizontal direction;

transparent panel means for receiving a pointing input superposed on a display screen of said display means;

pattern memory means storing a plurality of pattern data including data of display areas displayed on a portion of said display means indicating pointing input positions wherein each of said display areas is of the same size;

key position memory means storing a plurality of position information each defining one of a plurality of effective areas for accepting pointing inputs made in correspondence to each of said display areas;

said key position memory means further storing key code information read out in response to a pointing input to said panel means for identifying said effective areas; and said panel means being separated from said display screen and said display areas being viewed from different viewing directions such that an apparent shifting in alignment of said effective areas with respect to said display areas occurs in variable amounts depending upon the different viewing directions to cause parallax induced pointing input errors to occur for pointing inputs made about the periphery of said display areas; and said effective areas being respectively of different sizes with respect to one another and corresponding ones of said display areas according to said amounts of the shifting, for accepting said parallax induced pointing input errors.

14. A pointing input panel apparatus, comprising:

display means;

transparent panel means for receiving a pointing input superposed on a display screen of said display means;

pattern memory means storing a plurality of pattern data including data of display areas displayed on said display means indicating pointing input positions;

key position memory means storing a plurality of position information each defining a plurality of effective areas for pointing inputs made in correspondence to each of said display areas, each of said effective areas including a first portion in superposed alignment with a corresponding one of said display areas;

said key position memory means further storing key code information read out in response to a pointing input to said panel means for identifying said effective areas; and said panel means being separated from said display screen such that an apparent alignment of each of said effective areas with respect to a corresponding one of said display areas changes in accordance with different viewing directions of said display areas thus causing parallax induced pointing inputs intended to be within said first portion to be made outside a periphery of said first portion; and said effective areas having a second portion outside the periphery of the first portion that extends in a direction outwardly with respect to the first portion to form an overlap area for accepting the parallax induced pointing inputs wherein the extending direction and a size of the overlap area for the effective areas changes in accordance with a position of said display areas on said display screen.

15. A panel apparatus according to claim 14, wherein said direction extends below a center point of said transparent panel.

16. A panel apparatus according to claim 14, wherein said predetermined different directions extend radially inwardly toward a center of said display screen and wherein the size of the overlap area decreases for each of the effective areas as the position of the corresponding display areas approaches said center point.

* * * * *